Patented May 19, 1925.

1,538,089

UNITED STATES PATENT OFFICE.

JOHN N. CAROTHERS AND ARTHUR B. GERBER, OF ANNISTON, ALABAMA, ASSIGNORS TO FEDERAL PHOSPHOROUS COMPANY, OF BIRMINGHAM, ALABAMA, A CORPORATION OF ALABAMA.

PROCESS FOR THE PURIFICATION OF PHOSPHORIC ACID.

No Drawing.   Application filed March 23, 1922. Serial No. 546,162.

*To all whom it may concern:*

Be it known that we, JOHN N. CAROTHERS and ARTHUR B. GERBER, citizens of the United States of America, residing at Anniston, in the county of Calhoun and State of Alabama, have invented certain new and useful Improvements in Processes for the Purification of Phosphoric Acid, of which the following is a specification.

This invention relates to a process for the purification of phosphoric acid in a manner which permits operation on a commercial scale and in a manner not previously employed. It has as its object the production of a higher grade phosphoric acid by a more direct and economic process than has been heretofore practiced, or possible.

In United States Letters Patent 1,283,398, a process is disclosed for the direct purification of ortho-phosphoric acid by crystallization which requires the acid to be recrystallized a number of times to obtain a pure or substantially pure grade of ortho-phosphoric acid. In all cases throughout this specification where the term phosphoric acid is used, reference is to ortho-phosphoric acid. According to our present process, a combination of steps are employed in which a chemical treatment is previously used to partially purify the phosphoric acid before the crystallization step. This chemical treatment does not produce an acid of a purity equal to that possible when crystallization is employed in conjunction with a chemical purification method. However, the combination of the purification and crystallization steps makes it possible to produce in one crystallization an acid of higher purity than is possible where the acid is purified directly without previous chemical treatment. In carrying out our process, the phosphoric acid is collected from the smelting operation and is treated first by chemical methods whereby a portion of the impurities are eliminated. Subsequent to this treatment, the suspended solids are removed by well known methods for clarifying acid solutions. After the acid has been treated in this manner, air is bubbled through it to remove the volatile impurities which remain as fluorine and such. The temperature at which this aeration takes place is about 50° C., since it is found that with slightly warmed acid the impurities are very readily removed.

After the acid is aerated to remove the volatile impurities, it is then cooled to a temperature between zero and 10° C., at which temperature crystals of phosphoric acid are formed. In some cases, it is desirable to induce or accelerate crystallization by adding a crystal of phosphoric acid to the chilled liquid. This step hastens crystallization and in some instances causes crystals to form in a solution that might not crystallize otherwise. After the formation of these crystals, the liquid and solid phosphoric acid are separated by any well known method; however, a centrifugal machine is the preferred means of separation.

We have found that an acid of much lower phosphoric acid concentration may be used than has heretofore been thought possible. In our development, we have discovered that an acid of a specific gravity about 1.75% and phosphoric acid from 82 to 90% $H_3PO_4$ is a very desirable concentration at which to work. Crystallization may be carried out at somewhat lower concentrations, but the temperature must be reduced so low that the operation is not advantageous. Also, crystallization may be carried out at higher concentrations, however, with the acid we use these higher concentrations are not needed. If a higher concentration is used the acid crystallizes into a solid mass with no resultant solution to carry off the impurities.

In order that our invention may be more fully distinguished from existing patents, the following description is given of the method employed in carrying out this process, so that those skilled in the art may be able to practice the same.

We first obtain acid in a relatively pure and concentrated form such as is recovered by electrical precipitation or condensation from smelting operations. To a batch of 1,000 gals. of such acid containing a percentage of ortho-phosphoric acid in excess of 82 per cent, we add 15 lbs. of hydrogen sulphide ($H_2S$) or the equivalent of any suitable sulphide compound to eliminate by precipitation the arsenic contained in the acid. Then we add into the same batch about 40 lbs. of 66 degree Baumé sulphuric acid ($H_2SO_4$) in order to precipitate the lead and lime; we then add about 20 lbs. of commercial water-glass or sodium silicate for the precipitation of fluorine. This treated phosphoric acid is then allowed to stand until the suspended matter settles to the bottom of the storage tank when the clear acid is drawn off and passed through any well known clearing medium suitable for the clarification of acid solutions. After clarification the acid is aerated to remove any hydrogen sulphide or fluorine odors which may remain. This partially purified acid is then conducted in any suitable manner to small tanks containing about 50 gals. each, which are subjected to a refrigerating bath or atmosphere where the temperature is reduced to from zero to about 10° C. When the acid has reached a temperature within this range, a small crystal of phosphoric acid is added to the liquid. After standing in this chilled bath or atmosphere the crystals form in a manner which will permit ease in the separation of the crystals from any resulting liquor or liquid acid. This separation may be effected by any well known method, preferably the use of a centrifugal machine properly adapted to handle the strong acid solutions. The crystals which are thus removed from the remaining liquid acid will be found to be pure ortho-phosphoric acid and will pass all tests required for use as drugs in medicine or certain chemicals where an exceptionally high purity phosphoric acid is required.

The pure acid crystals can be shipped as such where the trade requires it, but it is preferable to dissolve the crystals in water so that they can be shipped in liquid form; by this latter means we avoid the difficulties in shipping in crystal form, such as a tendency of the crystals to solidify and cake in the container.

Having thus described our invention, what we claim as new and desire to secure by Letters Patent, is:—

1. The herein described method of purifying phosphoric acid in highly concentrated form, which consists in chemically treating the acid to remove the major portion of the impurities contained therein, then aerating the treated acid while at a temperature of approximately 50° C. to remove volatile impurities, then separating the treated acid from the suspended and precipitated solids, then cooling the acid to a temperature at which crystals of phosphoric acid will form, and separating the crystals from the remaining liquids.

2. A method of purifying phosphoric acid produced in highly concentrated form from smelting operations, which consists in employing chemical treatment to remove a portion of the arsenic, lead, lime and fluorine impurities contained therein, then passing air through the acid to remove a portion of the volatile impurities, then removing the suspended solids, then cooling to a temperature at which crystals of phosphoric acid form, and then separating the solid phosphoric acid from the remaining liquid.

In testimony whereof we affix our signatures.

JOHN N. CAROTHERS.
ARTHUR B. GERBER.